UNITED STATES PATENT OFFICE.

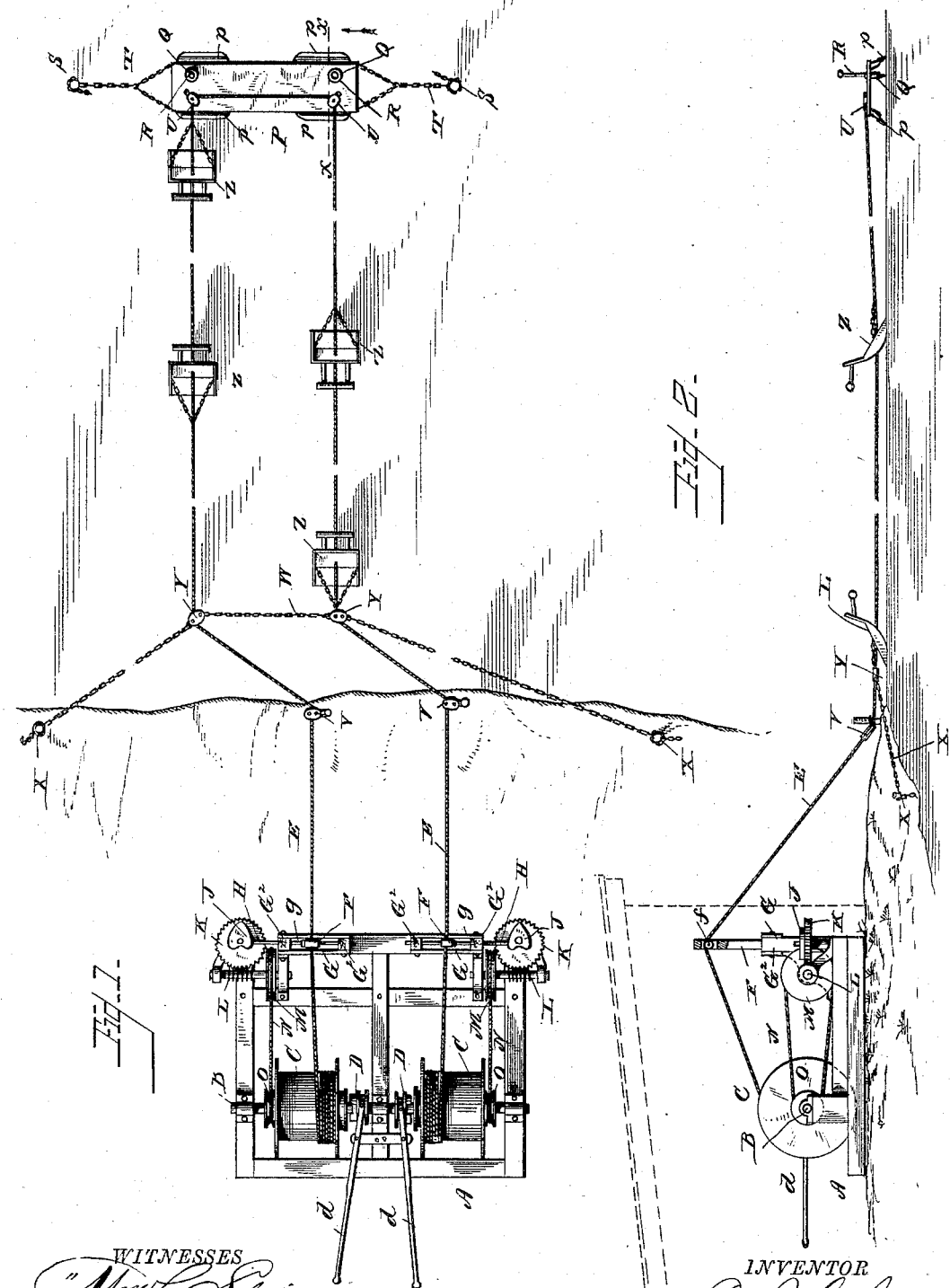

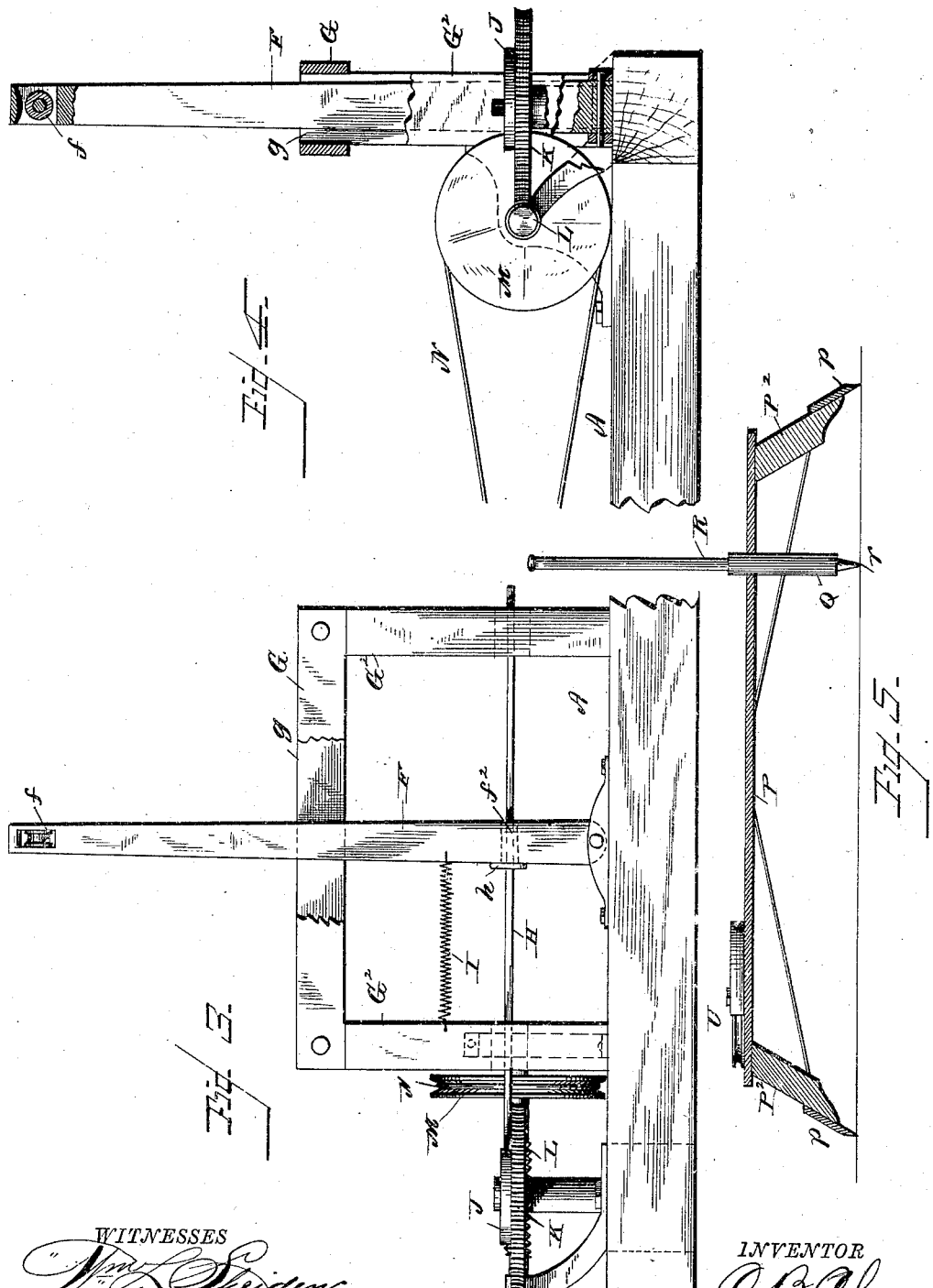

CHARLES B. CHURCH, OF WASHINGTON, DISTRICT OF COLUMBIA.

ICE-HARVESTING APPARATUS.

SPECIFICATION forming part of Letters Patent No. 314,651, dated March 31, 1885.

Application filed July 14, 1884. (No model.)

*To all whom it may concern:*

Be it known that I, CHARLES B. CHURCH, a citizen of the United States, residing at Washington, in the District of Columbia, have invented certain new and useful Improvements in Ice-Harvesting Apparatus; and I do hereby declare that the following is a full, clear, and exact description of the invention, which will enable others skilled in the art to which it appertains to make and use the same.

This invention relates to steam apparatus or machines for harvesting ice; and it has special relation to scraping apparatus for removing snow, &c., from the surface of a field of ice.

The object of my invention is to provide harvesting mechanism of this class which will possess advantages in point of simplicity, inexpensiveness, and general efficiency, and which may be operated or governed with convenience, safety, and economy.

To this end my invention consists, substantially, in an improved cable mechanism carrying suitable scrapers adapted to move over the ice-field, the cable being operated by steam-power mechanism, stationary or traveling, upon the shore, and the adjustment of the cable over the field of ice being effected, independent of any change in position of the steam operating mechanism, by means of a guide-rope at its shore end and a movable sleigh at the opposite end of the field of ice; and the invention further consists in certain details of construction and operation, substantially as will be hereinafter fully set forth.

In the drawings, Figure 1 is a top or plan view of steam ice-scraping apparatus embodying my improvements. Fig. 2 is a side view of the same. Fig. 3 is an elevation in detail of the mechanism for guiding the ends of the cable upon the winding-drums. Fig. 4 is a detail side elevation of this guiding mechanism, partly in section. Fig. 5 is a detail transverse sectional view taken through the anchor-sleigh on the line *x x*, Fig. 1.

Corresponding parts in the figures are denoted by the same letters of reference.

Referring to the drawings, A designates a frame which carries the cable-operating mechanism, and may be of any suitable construction. This frame is provided with bearings for a transverse shaft, B, upon which are mounted two drums, C C, and intermediate clutch mechanism, D D, by which the drums are governed to effect their independent operation. The drums are preferably disposed near the ends of the frame, and the clutch mechanism is provided at the inner ends of the drums. The clutches may be of any ordinary or suitable construction, and are adapted to be conveniently and independently operated by means of rearwardly-projecting levers *d d*, fulcrumed upon the frame.

The steam-power is applied to the shaft B, and may be arranged at any suitable point in relation to frame A, or may be disposed directly upon the latter.

The main frame carrying the operating mechanism is arranged upon the shore, whereby all inconvenience and liability of the heavy machinery breaking through the ice, which frequently occurs where the machinery is seated upon the ice or travels thereon, is entirely obviated. It is not necessary that the frame be moved or transported to keep it in the same plane with the movable anchor-sleigh at the opposite side of the field of ice, as the adjustment of the cable at its shore end is readily effected by means of the guide-rope mechanism, hereinafter specified, independent of the position of the main frame. The latter may therefore be stationary at a suitable point upon the shore, in which case it can be housed in connection with the steam machinery. Under some circumstances, however, the frame may be provided with wheels, adapting it to travel upon a track extending along the shore, in which case the steam-boiler and engine mechanism is carried upon the frame.

The cable E extends from one of the drums across the ice-field to the anchor-sleigh, around pulleys on the latter, and back to the other drum, its ends being thus connected with the drums, and adapted to alternately wind and unwind thereon. In connection with each drum I provide the following mechanism to guide the ends of the cable as they wind upon the drum during the operation of the apparatus: A lever, F, is fulcrumed at the front of the frame A and in front of each drum, and is provided at its free end with a pulley, *f*, over which the cable passes from the drum. This lever moves longitudinally in relation to the drum, and carries the cable, and it is preferably guided in a slot, *g*, formed in a cross-piece, G, embodied in a frame secured at the front of the frame A, and comprising, also, side pieces G² G². In the lever F is provided a slot, $f^2$, through which passes a transverse rod or bar, H, adapted to slide in suitable bearings upon the side pieces G², and provided with a shoulder or enlargement, $h$, engaging the lever, to cause its movement in relation to the drum. A coiled spring, I, is provided for returning the lever on its opposite movement and to its normal position. The operating-bar H is operated by a cam, J, eccentrically secured upon a worm-wheel, K, and approximating a heart shape, such as is adapted for converting a rotary into a reciprocating motion. The worm-wheel is operated by means of a worm shaft or screw, L, journaled in suitable bearings, and carrying a pulley, M, connected by an endless chain or band, N, with a pulley, O, upon the shaft B, by which arrangement the motion of this shaft is transmitted to reciprocate the guide-lever F longitudinally in relation to the drum as the cable winds thereon.

P designates the anchor-sleigh, which comprises a top board or piece having inclined side pieces P², carrying plates or runners $p$, which project from their lower edges, and are disposed in an inclined position, as shown, whereby they bind into the ice and retain the sleigh in position against the tension of the cable. At the ends of the sleigh vertical tubes Q Q pass through the top piece, and are adapted to receive and brace bars R, having pointed bottom ends, $r$, which enter the ice and secure the sleigh against accidental displacement. The sleigh may also be anchored at each end by means of stakes S S, connected by ropes or chains T T, as illustrated in Fig. 1.

Upon the top of the sleigh, near each end, are arranged suitable pulleys, U U, around which the cable passes and is adapted to travel.

The shore ends of the cable pass directly from the guide-levers F to suitable pulleys, V V, fixed to a stake or otherwise secured at the shore-line. At a point in front of the pulleys V V the cable is engaged by a transverse guide line or rope, W, extending along the shore-line, and secured by stakes X X or other suitable devices at its ends. This guide rope or chain carries suitable pulleys, Y Y, around which the cable passes. It is manifest that by adjusting this guide-line transversely in relation to the frame A the shore end of the cable may be correspondingly moved, while the said frame A and operating machinery remain in the same position, by which arrangement the cable may be adjusted over the field of ice as desired by simply moving the anchor-sleigh and guide-line, and without the necessity of moving the more cumbersome operating machinery.

I prefer to employ four scrapers, Z, suitably secured upon the cable, the arrangement being such that a pair of scrapers is operated by each side section of the cable—i. e., the portion of the cable extending from one of the drums to one end of the anchor-sleigh.

The pair of scrapers secured upon each side section project in opposite directions, and are disposed one at about the center of the side portion and the other at the end thereof, whereby the scrapers operate from the center of the cable toward each end thereof, and while one scraper is in operation the other is being removed or returned to a position at the center.

The action of each side section of the cable is the same, and it is obvious that the scrapers upon each side section operate simultaneously and alternately in opposite directions.

The operation and advantages of my invention will be readily understood by those skilled in the art to which it appertains. The apparatus is simple and inexpensive in construction, and operates with safety, facility, and convenience, and may be governed by a much smaller force of men and with less labor than is necessary with the heavy and cumbersome machinery now in use.

I claim as my invention and desire to secure by Letters Patent—

1. The combination, in ice-harvesting apparatus, of operating mechanism, a continuous cable carrying the harvesting devices and having its ends connected with the operating mechanism, and a guide-line connected to the cable at its inner end, and adapted to be adjusted to carry and adjust the cable independent of a change in position of the operating machinery, substantially as set forth.

2. The combination, in ice-harvesting apparatus, with stationary operating machinery, of a cable connected with the same and adapted to extend over the field of ice, and adjustable devices consisting of an anchor-sleigh and a guide-line respectively connected with the cable at its shore and outer ends, to adjust the same transversely in relation to the operating mechanism and independent of any change in the position of the latter, substantially as set forth.

3. In ice-harvesting apparatus, a cable operated by steam-power and carrying ice-scrapers, and adjustable devices consisting of an anchor-sleigh and a guide-line respectively connected to end of the cable mechanism, for adjusting it over the field of ice independent of movement of the operating mechanism, substantially as set forth.

4. The combination, with steam operating mechanism and with the continuous cable connected with the same at its end and secured by an anchor-sleigh at its outer portion, of an adjustable shore-line engaging the cable and carrying the same to effect its adjustment, substantially as set forth.

5. The combination of the operating mechanism arranged upon the shore, the cable connected at its ends with the same, an anchor-sleigh carrying the outer end of the cable, and a shore-line secured at its ends and carrying pulleys engaging the cable, substantially as and for the purpose set forth.

6. The combination of the main frame arranged upon the shore and carrying the drums, the cable having its ends connected therewith, the anchor-sleigh carrying the outer end of the cable, the pulleys arranged at the shore and carrying the cables, and the guide rope or chain extending transversely along the shore-line and adjustably secured at its ends, and having pulleys engaging the cable, substantially as and for the purpose set forth.

7. In ice-harvesting apparatus, the combination, with the frame carrying two drums, and with the cable connected with the drums and carrying harvesting mechanism, of clutch mechanism, substantially as described, for alternately throwing the drums into and out of operation, substantially as and for the purpose set forth.

8. The combination, in ice-harvesting apparatus, with the cable carrying harvesting mechanism and a drum for winding the same, of a reciprocating lever arranged in front of the drum and carrying the cable, a sliding bar for operating this lever, a cam engaging the bar, and mechanism for operating the cam, substantially as and for the purpose set forth.

9. The combination of the frame carrying the drums, the cable carrying ice-harvesting mechanism, the slotted reciprocating guide-levers engaging the cable, sliding bars having shoulders or enlargements acting upon the lever, the returning-springs, the cam mechanism, the worm-shafts having a pulley, pulleys on the drum-shaft, and connecting chains or bands, substantially as and for the purpose set forth.

10. The combination, with the anchor-sleigh having the vertical tubes, of the bars received by the same and having pointed bottom ends to engage the ice, substantially as and for the purpose set forth.

11. The combination, with the herein-described cable, of four ice-scrapers disposed in pairs upon the side sections of the cable, the scrapers of each pair projecting in opposite directions, and being secured at about the center and at one end of the said side section of the cable, substantially as shown, and for the purpose set forth.

In testimony whereof I affix my signature in presence of two witnesses.

CHARLES B. CHURCH.

Witnesses:
J. R. LITTELL,
JOHN T. C. CLARK.